(12) United States Patent
Merriman et al.

(10) Patent No.: US 10,176,210 B2
(45) Date of Patent: *Jan. 8, 2019

(54) SYSTEM AND METHOD FOR MINIMIZING LOCK CONTENTION

(71) Applicant: MongoDB, Inc., New York, NY (US)

(72) Inventors: Dwight Merriman, New York, NY (US); Eliot Horowitz, New York, NY (US)

(73) Assignee: MongoDB, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,538

(22) Filed: Jun. 28, 2017

(65) Prior Publication Data
US 2017/0300522 A1 Oct. 19, 2017

Related U.S. Application Data

(63) Continuation of application No. 14/200,435, filed on Mar. 7, 2014, now Pat. No. 9,710,510.

(60) Provisional application No. 61/781,936, filed on Mar. 14, 2013, provisional application No. 61/776,695, filed on Mar. 11, 2013.

(51) Int. Cl.
*G06F 17/30* (2006.01)
*G06F 12/08* (2016.01)
*G06F 11/20* (2006.01)

(52) U.S. Cl.
CPC .. *G06F 17/30362* (2013.01); *G06F 17/30377* (2013.01); *G06F 17/30575* (2013.01); *G06F 11/2094* (2013.01); *G06F 12/08* (2013.01); *G06F 2201/80* (2013.01); *G06F 2201/825* (2013.01)

(58) Field of Classification Search
None
See application file for complete search history.

(56) References Cited

U.S. PATENT DOCUMENTS

| | | | | |
|---|---|---|---|---|
| 5,644,755 A | * | 7/1997 | Wooten | G06F 9/45533 703/23 |
| 5,978,935 A | * | 11/1999 | Kim | G11C 29/003 714/40 |
| 6,219,656 B1 | * | 4/2001 | Cain | G01R 22/06 705/400 |

(Continued)

*Primary Examiner* — Son T Hoang
(74) *Attorney, Agent, or Firm* — Wolf, Greenfield & Sacks, P.C.

(57) ABSTRACT

The methods and systems can include a database management component configured to manage database instances, the database management component also configured to receive a first data request operation on the distributed database, an execution component configured to process the first data request operation including at least one write request on at least one database instance managed by the database management component, and a fault prediction component configured to detect a potential page fault responsive to a target data of the write request, wherein the execution component is further configured to suspend execution of the first data request operation, request access a physical storage to read the target data into active memory, and re-execute the first data request operation after a period of time for suspending the first data request operation.

22 Claims, 6 Drawing Sheets

(56) References Cited

U.S. PATENT DOCUMENTS

| | | | |
|---|---|---|---|
| 6,829,689 B1 * | 12/2004 | Van Dyke | G06F 13/1605 |
| | | | 711/103 |
| 7,398,365 B1 * | 7/2008 | Hardman | G06F 11/1464 |
| | | | 711/161 |
| 9,710,510 B2 | 7/2017 | Merriman et al. | |
| 2008/0077923 A1 * | 3/2008 | Mosek | G06F 9/3802 |
| | | | 718/100 |
| 2014/0258255 A1 | 9/2014 | Merriman et al. | |

* cited by examiner

SYSTEM AND METHOD FOR MINIMIZING LOCK CONTENTION

RELATED APPLICATIONS

This Application claims the benefit under 35 U.S.C. § 120 of U.S. application Ser. No. 14/200,435, entitled "SYSTEM AND METHOD FOR MINIMIZING LOCK CONTENTION" filed on Mar. 7, 2014, which is herein incorporated by reference in its entirety. Application Ser. No. 14/200,435 claims priority under 35 U.S.C. § 119(e) to U.S. Provisional Application Ser. No. 61/781,936, entitled "SYSTEM AND METHOD FOR MINIMIZING LOCK CONTENTION" filed on Mar. 14, 2013, which is herein incorporated by reference in its entirety. Application Ser. No. 14/200,435 claims priority under 35 U.S.C. § 119(e) to U.S. Provisional Application Ser. No. 61/776,695, entitled "SYSTEM AND METHOD FOR MINIMIZING LOCK CONTENTION" filed on Mar. 11, 2013, which is herein incorporated by reference in its entirety.

BACKGROUND

Speed and consistency of data access are highly important and can be highly variable depending on the architecture of any database environment. Speed can be affected by levels of concurrency allowed by the database environment. If multiple operations can be processed simultaneously, speed of data access can be improved. However, implementing levels of concurrency often necessitates ensuring data integrity. For example, two operations should not be allowed to write to the same data at the same time. In some approaches write locks are used for writing data, locking out other operations from accessing data while it is written. In some conventional approaches, concurrency and throughput can be impacted where, for example, write operations block upon execution.

SUMMARY

It is realized that in large distributed databases read operations can be processed very efficiently and with high levels of concurrency. Greater concurrency can be achieved in a large distributed database by implementing a non-blocking page fault architecture. Accordingly, provided are systems and methods for architecting improved non-relational database models and methods for execution in distributed database systems. According to some embodiments, the improved systems and methods include a framework for handling page fault exceptions. In one embodiment, write operations involving data not in active memory throw page fault exceptions. The write operations can then be held (releasing any locks), allowing other, unrelated operations to be concurrently executed while data is read from disk and written into active memory. Once the data is read, the write operations can be re-executed. In some embodiments, a model of virtual memory is used to predict page faults.

According to another aspect, if a page fault is predicted, the data not in active memory can be read into active memory before write operations are executed, and before any locks are held. Resulting from the minimization of such lock contention, is that the system increases concurrency. The system enables the database server to do useful work, for example, while the IO subsystems are executing direct memory access ("DMA") operations to capture the bytes from disk to memory, rather than blocking and waiting on that event.

According to one aspect, a computer-implemented method for minimizing lock contention in a distributed database system is provided. The method comprises receiving a first data request operation on a distributed database, processing the first data request operation on at least one database instance managed by a database manager, wherein the first data request operation includes at least a write request, detecting, by a computer system, a potential page fault responsive to target data of the write request, suspending execution of the first data request operation, requesting, access to a physical storage to read the target data into active memory, during a time period for suspending the first data request operation, and re-executing the first data request operation.

According to one embodiment, the method further comprises generating a model of the active memory. According to one embodiment, detecting the potential page fault includes determining the target data associated with the at least one write request will result in a page fault based on the model of the active memory. According to one embodiment, determining the target data associated with the at least one write request will result in a page fault includes approximating the data stored in the active memory based on the model. According to one embodiment, suspending operation of the first data request includes relinquishing, by the computer system, one or more locks associated with the first data request operation.

According to one embodiment, requesting, access to a physical storage to read the target data into active memory, during a time period for suspending the first data request operation According to one embodiment, the method further comprises determining, by the system, that the first data request operation can be executed after yielding processing to subsequent operations. According to one embodiment, determining that the first data request operation can be executed after yielding processing to subsequent operations comprises an act of determining that a data mutation has not occurred.

According to one embodiment, determining that the first data request operation can be executed after yielding processing to subsequent operations includes an act of determining that the first data request operation includes at least one write request operation. According to one embodiment, suspending execution of the data request operation includes storing the data request operation for subsequent execution. According to one embodiment, storing the data request operation for subsequent execution includes storing the data request operation in executing memory. According to one embodiment, processing the first data request operation includes taking, by the computer, system at least one lock on at least one database instance.

According to one embodiment, relinquishing the at least one lock includes relinquishing at least one lock which prevents execution on at least a portion of the distributed database. According to one embodiment, the distributed database includes database instances including collections of data, and wherein the portion of the distributed database includes a collection. According to one embodiment, the at least the portion of the distributed database comprises the at least one database instance. According to one embodiment, the collections of data include collections of documents.

According to one embodiment, the method further comprises executing a second data request operation unrelated to the page fault while the first data request operation is suspended. According to one embodiment, the method further comprises suspending execution of a second data request operation that generates an indication of a potential page fault. According to one embodiment, the method further comprises queuing execution of the first and second data request operations. According to one embodiment, the method further comprises optimizing the queue by arranging an order of the operations based on physical locations of data requested by each operation.

According to one aspect a system for minimizing lock contention in a distributed database environment is provided. The system comprises at least one processor operatively connected to a memory, the at least one processor when executing is configured to execute a plurality of system components, wherein the system components comprise a database management component configured to manage database instances, the database management component also configured to receive a first data request operation on the distributed database, an execution component configured to process the first data request operation including at least one write request on at least one database instance managed by the database management component, a fault prediction component configured to detect a potential page fault responsive to target data of the write request, wherein the execution component is configured to suspend execution of the first data request operation, request access a physical storage to read the target data into active memory, and wherein the execution component is configured to execute the first data request operation after a period of time for suspending the first data request operation.

According to one embodiment, the system further comprises a model component configured to generate a model of the active memory. According to one embodiment, detecting the potential page fault includes determining the target data associated with the at least one write request will result in a page fault based on the model of the active memory. According to one embodiment, determining the target data associated with the at least one write request will result in a page fault includes approximating the data stored in the active memory based on the model. According to one embodiment, suspending operation of the first data request includes relinquishing one or more locks associated with the first data request operation. According to one embodiment, requesting access to a physical storage to read the target data into active memory, is executed during a time period for suspending the first data request operation.

According to one embodiment, the at least one processor is configured to determine that the first data request operation can be executed after yielding processing to subsequent operations. According to one embodiment, the at least one processor is configured to determine that data mutations have not occurred responsive to the first data request. According to one embodiment, the at least one processor is configured to store the data request operation in the executing memory. According to one embodiment, the execution component is configured to execute a second data request operation unrelated to the first data request operation while the first data request operation is suspended.

According to one embodiment, the execution component is configured to suspend execution of a second data request operation that generates an indication of a page fault. According to one embodiment, the execution component is configured to queue execution of the first and second data request operations. According to one embodiment, the execution component is configured to optimize the queue by arranging an order of the operations based on physical locations of data requested by each operation.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
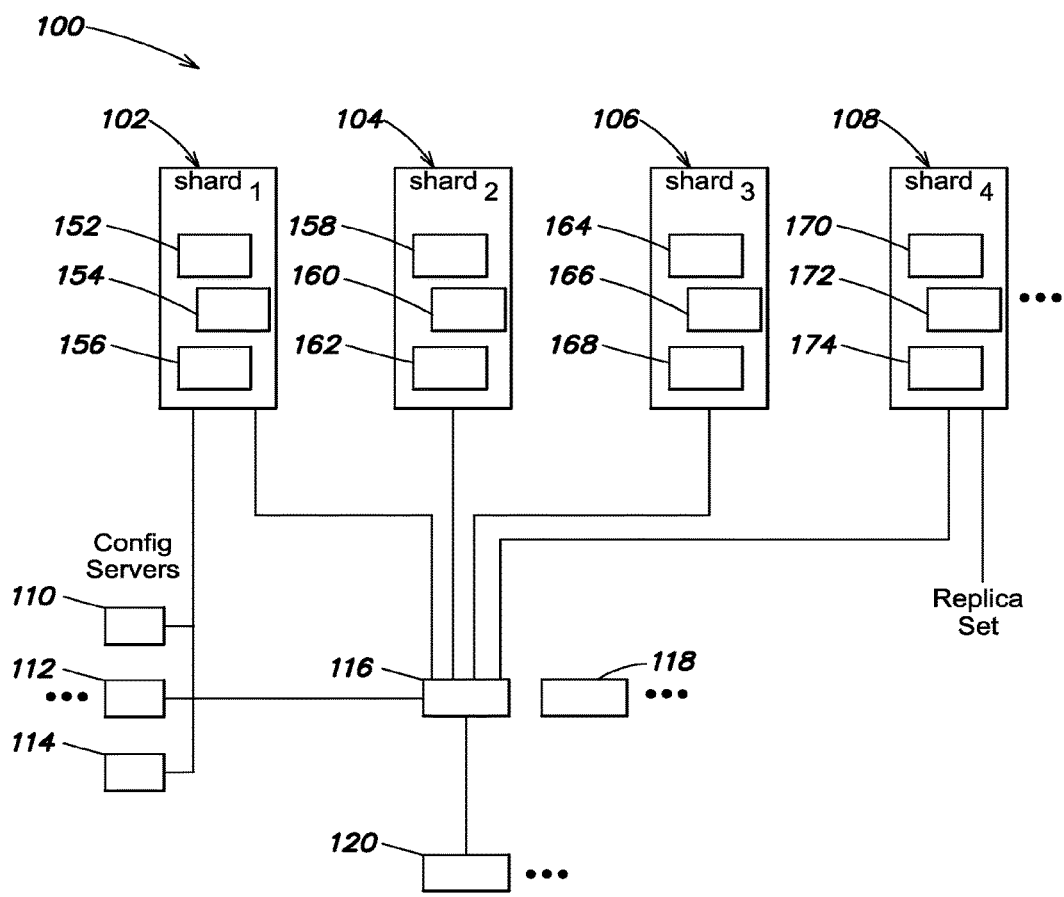
FIG. 1 is a block diagram of an example system architecture of a database according to one embodiment.

According to one aspect, improvements in concurrent execution improve the capability of the entire distributed database. It is useful for database systems to allow for concurrent execution of commands. For example, in a distributed database, multiple nodes can process data request operations from multiple clients concurrently. Database systems and/or individual nodes can also use virtual memory managed by an operating system to improve data access speed, writing and reading pages of data/memory to an active memory (e.g., dynamic random access memory (DRAM)) while providing long term data storage on another device (e.g., physical storage including, for example, a disk drive). If data requested is not found in the active memory, the request on the database can generate a page fault managed by the operating system. The operating system can be configured to read data into active memory from long term storage. Traditionally, operating systems manage the transition of data from physical storage to active memory. For example, the operating system can generate and manage a virtual memory, which organizes data into pages that are swapped in and out of active memory from physical storage. The method of handling the page fault by the OS can affect performance of the database system. In one embodiment, releasing locks on execution resources in response to a prediction of a page fault allows concurrent operations to proceed while the physical storage is accessed. In one example, the page fault) and subsequent transfer of the page from disk to memory can proceed during a time when the system is not holding a write lock. Further, queued or other operations can proceed concurrently while maintaining data integrity.

According to some embodiments, database systems and methods implement a contention framework for minimizing lock contention during page faults. In one example, the system predicts faults based on a model of the virtual memory. By predicting faults the system minimizes lock contention and the framework is configured to improve execution of concurrent operations. In some embodiments, the contention framework is implemented on database systems and through database methods that can improve data access speeds and reduce data resources consumed during read/writes. In some embodiments, a contention framework is implemented on a distributed database system that supports eventual consistency and fault tolerance through replica sets.

Eventually-consistent data architectures replicate data changes throughout database instances. In some embodiments, a primary data source manages writes to the data and distributes the writes asynchronously to secondary database instances. Once write activity ceases all secondary instances eventually become consistent with the primary instance. Replica sets (discussed in greater detail below) can be implemented in an eventually consistent setting as a group of nodes that shares responsibility for a portion of data in a database. In other implementations, replica sets can also be implemented to provide strongly consistent behavior. In one example, by limiting read operations to primary nodes within a replica set, the behavior is strongly consistent. In other implementations, read request may be permitted at secondary nodes, which requires the system and/or data architect to understand/accept that reads to secondary nodes may not reflect recently written data.

In some embodiments, each replica set is configured to host one or more shards or partitions of data. Each portion of the data can be implemented as one or more shards of data. Configuration servers can also be implemented to maintain configuration data across a plurality of shards and/or replica sets. The configuration data can reflect, for example, what data is stored in each of the shards. In some implementations, a database router can be configured to accept requests for database access, and route data operations based on the configuration data. Various database environments (including, e.g., router, config servers, shard servers) can support various data architectures. In one embodiment, the base unit of data storage is configured as a document.

Some examples of document organization formats include the known JSON (JavaScript Object Notation) and BSON (binary encoded serialization of JSON) formatting for documents. BSON is a binary format in which zero or more key/value pairs are stored as a single entity. The BSON entity can be referred to as a document. These documents can be organized into shards of data.

According to some example environments of a database management system, one or more servers can host multiple shards of data, and each shard can be configured to respond to database requests as if the shard were a complete database. In some embodiments, a routing process can be employed to ensure the database requests are routed to the appropriate shard or shards. "Sharding" refers to the process of splitting the database into partitions, which can be referred to as "shards." FIG. 1 shows a block diagram of an example architecture for a database system 100, on which the contention framework can be implemented. The database system 100 is configured to provide access to stored data through database shards. The database can be hosted on a plurality of servers hosting a plurality of shards. The database system can be identified as a shard cluster, a grouping of shards that collectively represent the data within the database. A shard cluster typically comprises multiple shard servers (e.g., 102-108) hosting multiple partitions (e.g., 152-174) or shards of data, one or more configuration servers (e.g., 110-114) for metadata management, and shard router processes (e.g., 116-118) for directing data access requests, based on, for example, metadata on the configuration servers. Metadata for the shard cluster can include, for example, information on the ranges of data stored in each partition, information associated with managing the shard cluster, partition counts, number of shard servers, data index information, partition size constraints, and data distribution thresholds, among other options.

Each shard of data (e.g., 152-174) can be configured to reside on one or more servers executing database operations for storing, retrieving, managing, and/or updating data. In some embodiments, a shard server 102 contains multiple partitions of data which can also be referred to as "chunks" of database data. In some embodiments, a shard of data corresponds to a chunk of data. A chunk is also a reference to a partition of database data. A shard or chunk can be configured as a contiguous range of data from a particular collection in the database. Collections are logical organizations of subsets of database data. In one example, a collection is a named grouping of the data, for example, a named grouping of documents. As discussed above, documents can be a base unit of storage of data the database. Some examples of document organization formats include the known JSON (JavaScript Object Notation) and BSON (binary encoded serialization of JSON) formatting for documents.

For example, documents can be organized into a collection based on a named grouping, where the named grouping is homogenous or heterogeneous. In some embodiments, collections are organizations of database data similar to relational database tables.

According to one embodiment, configurations within a shard cluster can be defined by metadata associated with the database referred to as shard metadata. Shard metadata can include information on collections within a given database, the number of collections, data associated with accessing the collections, database key properties for a given collection, and ranges of key values associated with a given partition, shard, and/or chunk of data within a given collection, to provide some examples.

The three dots illustrated next to the system components in FIG. 1 indicate that the system component can be repeated. In some embodiments, adding additional shards, configuration servers, and/or shard routing processes can increase the capacity of the database system. The shard router processes 116-118 handle incoming requests from clients 120 (e.g., applications, web services, user initiated requests, application protocol interfaces, etc.). The router processes 116-118 are configured to provide a transparent interface to handle database requests. In particular, the client 120 need not know that a database request is being served by a sharded database. The shard router processes receive such client requests and route the database requests to the appropriate shard(s), e.g., 152-174 on the shard servers 102-108.

According to some embodiments, a router process, e.g., 116, can be configured to operate as a routing and coordination process that makes the various components of the cluster look like a single system, for example, to the client 120. In response to receiving a client request, the router process 116 routes the request to the appropriate shard or shards. The shard(s) return any results to the router process. The router process 116 can merge any results and communicate the merged result back to the client 120. In some examples, the router process 116 is also configured to establish current state information for the data distributed throughout the database by requesting metadata information on the database from the configuration server(s) 110-114. In some embodiments, the request for metadata information can be executed on startup of a routing process. Further requests can be initiated by the routing process and/or can be initiated by a configuration server. In some embodiments, a change at the configuration server can trigger a distribution of updates to any routing processes.

In some embodiments, changes that occur on the configuration server(s) can be propagated to each router process 116-118, as appropriate. For example, router processes 116-118 can be configured to poll the configuration servers(s) 110-114 to update their state information periodically. In others examples, router processes can be configured to poll the configuration servers(s) 110-114 to update their state information on a schedule, periodically, intermittently, and can be further configured to receive updates pushed from the configuration server(s) 110-114 and/or any combination of thereof.

According to some embodiments, the router processes capture metadata information on the shard cluster stored at the configuration servers. In some examples, the metadata information includes information on the data stored in the database, how the data is partitioned, version information associated with the partitions, database key values associated with partitions, etc. According to some embodiments, the router process 116 can be configured without persistent state information. For example, at initiation the router process 116 cannot fully route data requests until its state is updated with the metadata describing the distribution of data throughout the shards.

According to some embodiments, router processes can run on any server within the database and/or on any number of server(s) that is desired. For example, the router processes can be executed on stand-alone systems, and in other examples, the router processes can be run on the shard servers themselves. In yet other examples, the router processes can be run on application servers associated with the database. Under some installations, there are no limits on the number of router processes that can be invoked. The addition of routing processes can permit the database to route greater numbers of requests to the appropriate shards of data. In some embodiments, additional routing process can enable additional client connections to the partitioned database. In other embodiments, additional routing processes can facilitate management of the distribution of data within the database.

In some embodiments, each router process can be configured to act independently of any other routing processes being executed within the database. In some examples, the router processes do not coordinate processing, rather each router process can be configured to act independently. In some environments, this property enables a plurality of router processes with virtually no additional complexity, as all the router processes receive their state information from the configuration servers and no coordination between the router processes is required for routing data requests.

According to some embodiments, configuration server(s) 110-114 are configured to store and manage the database's metadata. In some examples, the metadata includes basic information on each shard in the shard cluster (including, for example, network communication information), server information, number of chunks of data, chunk version, number of shards of data, shard version, and other management information for routing processes, database management processes, chunk splitting processes, etc. According to some embodiments, shard or chunk information can be the primary data stored by the configuration server(s) 110-116. In some examples, shards and/or chunks are defined by a triple (collection, minKey, and maxKey) and the metadata stored on the configuration servers establishes the relevant values for a given chunk of data.

In some examples, each of the installed configuration server(s) has a complete copy of all the chunk metadata information for the database. According to some embodiments, various replication strategies can be implemented to maintain consistency between configuration servers. In addition to the consistency processes executed on the configuration servers, the shard cluster can be configured with various replication models to ensure consistent replication of any changes to the database's metadata stored on the configuration servers. In some embodiments, the replication model for the configuration servers can be different from the replication model used within the rest of the shard cluster, for example, on the shard servers 102-108. In one embodiment, the configuration servers can be configured to perform operations under various all-or-nothing approaches while the data stored in database shards can be configured to operate under an eventual consistency model.

According to some embodiments, a shard key pattern can be specified to partition a collection. The shard key pattern, in some embodiments, can be similar to the key pattern used to define an index. The shard key pattern establishes one or more fields to define the shard key upon which the database can distribute data. In some examples, shards are defined by a triple (collection, minKey, and maxKey). A given shard can be configured with a name for the collection to which the shard belongs corresponding to a collection in the triples and a range of key values that define the beginning and the end of the data found within the shard corresponding to minKey and maxKey.

In some embodiments, a shard cluster also includes processes for automatic failover and/or recovery. Proper operation of a shard cluster can require that each shard always remain online, or from a more practical standpoint, as available as is reasonably possible. Inconsistent results can be returned if one of the shards hosting necessary data is unavailable. According to one embodiment, each shard server in a shard cluster can be implemented as a replica set, e.g., shard server 108. A replica set can be configured to perform asynchronous replication across a series of nodes, with various processes implemented to handle recovery of primary node operations within the replica set. Such a configuration ensures high availability of the data replicated throughout the replica set.

Figure 2:
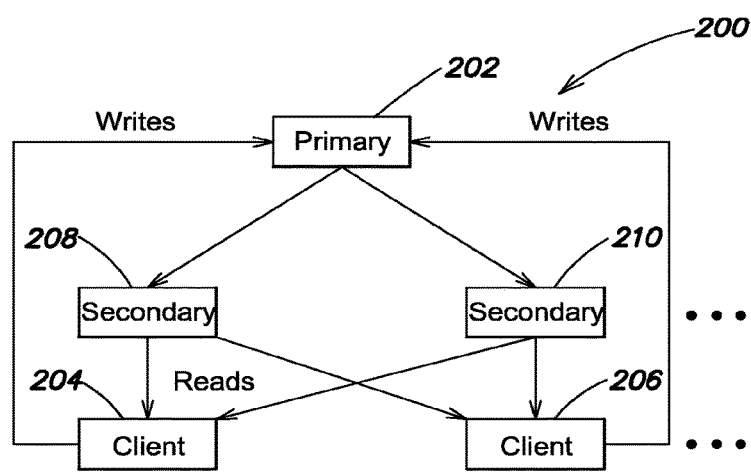
FIG. 2 is a block diagram of an example system architecture of a replica set according to one embodiment.

In some embodiments, a database system can be configured to permit read operations from any node in response to requests from clients. For reads, scalability becomes a function of adding nodes (e.g. servers) and database instances. Within the set of nodes, at least one node is configured as a primary server. A primary server/node provides the system with a writable copy of the database. In some implementations, only a primary node is configured to permit write operations to its database in response to client requests. The primary node processes write requests against its database and replicates the operation/transaction asynchronously throughout the system to connected secondary nodes. In some implementations, the group of primary and secondary nodes operates in conjunction to process and replicate database operations. The group of nodes can be thought of as a logical unit, a replica set, for handling database operations. Shown, for example, in FIG. 2 are the basic elements of a replica set: a primary or master node 202 and secondary or slave nodes 208-210. The primary node responsibility can transition between nodes 202, 208, and 210 within the replica set, permitting operation even in light of failures within the replica set. The secondary nodes 208-210 host replicas of the primary database and are configured to take on the primary role automatically in the event of a failure.

In some examples, the primary node receives and performs client write operations and generates an operation log. Each logged operation is replayed by the secondary nodes bringing the replicated databases into synchronization. In some embodiments, the secondary nodes query the primary node to identify operations that need to be replicated. The replica set and/or individual nodes can be configured to respond to read requests from clients by directing read requests to slave nodes 208-210.

In some embodiments, the system permits multiple operations to be processed concurrently. Thus, several clients can read data from the database using various nodes simultaneously. In some embodiments, the system uses a write lock when processing write operations. A write lock prevents other operations from being processed while the database is locked. The write lock can be used to prevent errors from occurring. For example, the write lock can prevent a node from reading a piece of data as the data is being changed and therefore reading incorrect or erroneous data.

Clients 204, 206 can include any entity requesting database services. A client can include an end-user system requesting database access and/or a connection to the database. An end-user system can request database services through an intermediary, for example, an application protocol interface (API). The client can include the API and/or its associated drivers. Additionally, web based services can interact with a distributed database, and the web based services can be a client for the distributed database.

By implementing each shard as a replica set, the shard cluster can provide for high availability and high consistency in the underlying data. In one example, a replica set can be a set of n servers, frequently three or more, each of which contains a replica of the entire data set for the given shard. One of the n servers in a replica set will always be a primary node. If the primary node replica fails, the remaining replicas are configured to elect automatically a new primary node. Each illustrated server can be implemented as a replica set, for example, as discussed in co-pending application Ser. No. 12/977,563 entitled "METHOD AND APPARATUS FOR MAINTAINING REPLICA SETS" filed on Dec. 23, 2010, incorporated herein by reference in its entirety. Other replication methodologies can be used to ensure each shard remains available to respond to database requests. In some examples, other multi-node systems can be used to provide redundancy within a sharded database. In one example, master/slave configurations can be employed. In others, various distributed architectures can be used for each shard within the shard cluster.

Figure 3:
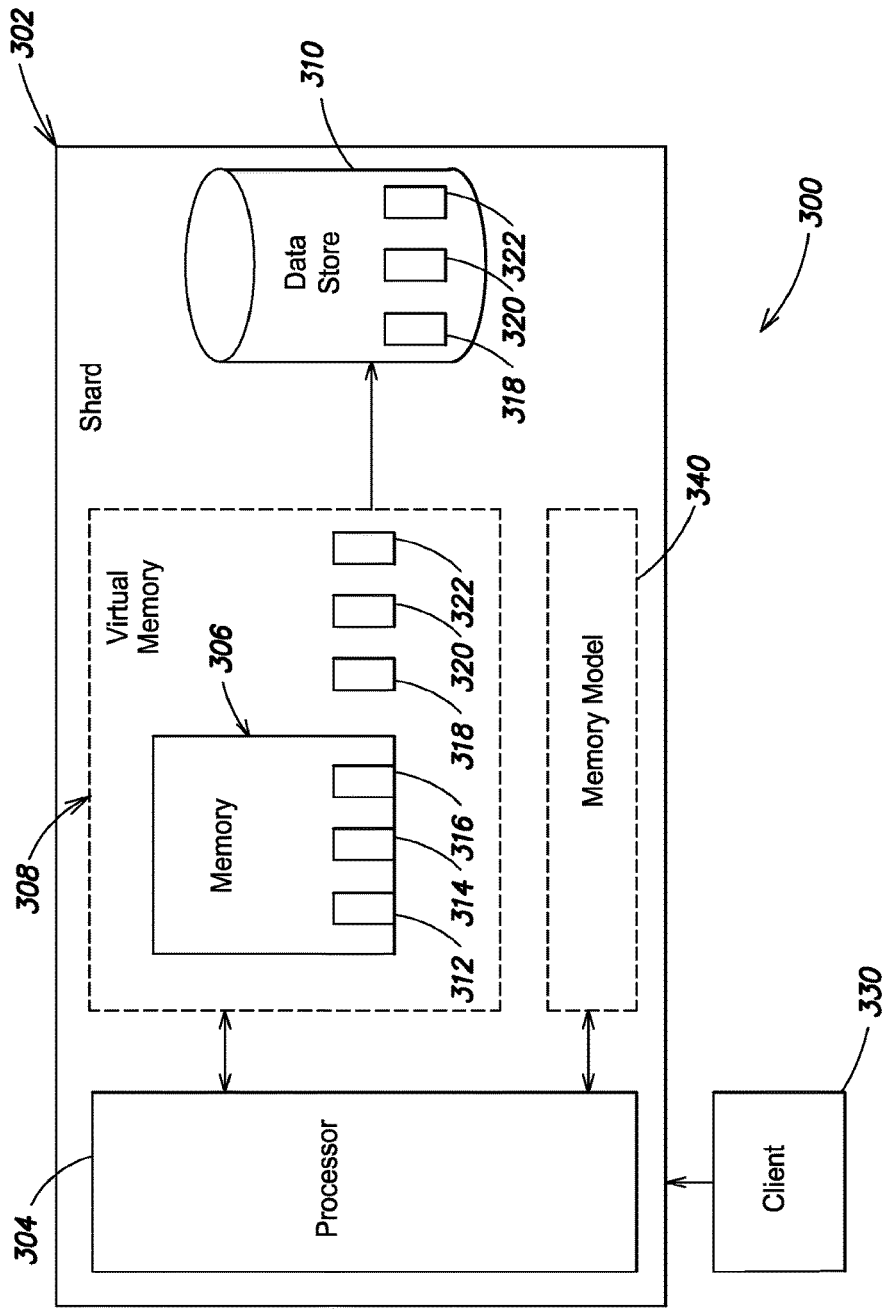
FIG. 3 is a block diagram of an example system architecture of a database according to one embodiment.

FIG. 3 shows an example architecture 300 of a computer system hosting one or more shards of data 302. The system includes a shard 302, which includes one or more processors 304, one or more memory devices 306, and one or more data stores 310. In some embodiments, the processor 304 implements a virtual memory 308 for managing data from the data store 310. For example, the processor 304 can be configured to organize data into pages 312-322 in the virtual memory 308, provide addresses to the pages 312-322 so that the data on the pages 312-322 can be accessed as requested, for example, by a client 330 from active memory. The virtual memory 308 can provide access to database data by swapping pages from long term storage sources into and out of active memory to improve data access speeds. Access to long term storage can be slow relative to data access from active memory. In some implementations, multiple pages 312, 314, 316 can be stored in active memory (e.g., on device 306) while data records 318, 320, 322 are stored on the data store 310. Data stored on the memory device 306 can be accessed more quickly than data stored on the data store 310. For example, if the data store 310 is a disk drive, accessing the requested locations can involve spinning the drive and moving a physical head to read the data off of a physical location on the drive as opposed to an access to a memory device 306 such as a dynamic random access memory (DRAM) or static RAM (SRAM). When the client 330 requests data not stored on a page and/or not in the memory device 306, for example, record 320, the processor 304 can access the data store 310 and copy the record 320 as a page swapped into active memory (e.g., on the memory device 308). This can require some data being ejected from active memory. Thus, data can be swapped and the requested data can become available for the shard 302 to provide to the client 330 from active memory.

According to one embodiment, rather than allowing a lock on the database during this process, the system can predict a page fault resulting in a memory request to physical storage. In some conventional approaches, a data request that results in a page fault (needs to access long term storage) can block subsequent data operations if, for example, the operations requesting the data hold locks on the database. In such an environment, subsequent requests are held until the faulting operation can be resolved and the locks released. In one example of a conventional system, write operations on the database instance on a data shard can trigger a blocking page fault thus preventing execution of subsequent operations.

According to one embodiment, releasing locks made during a write request in response to a page fault prediction allows the database to execute subsequent data operations, improving concurrency. Further, the page fault operations can proceed in the background without holding locks, preventing the I/O time from impacting performance of the subsequent operations on the database.

Figure 4:
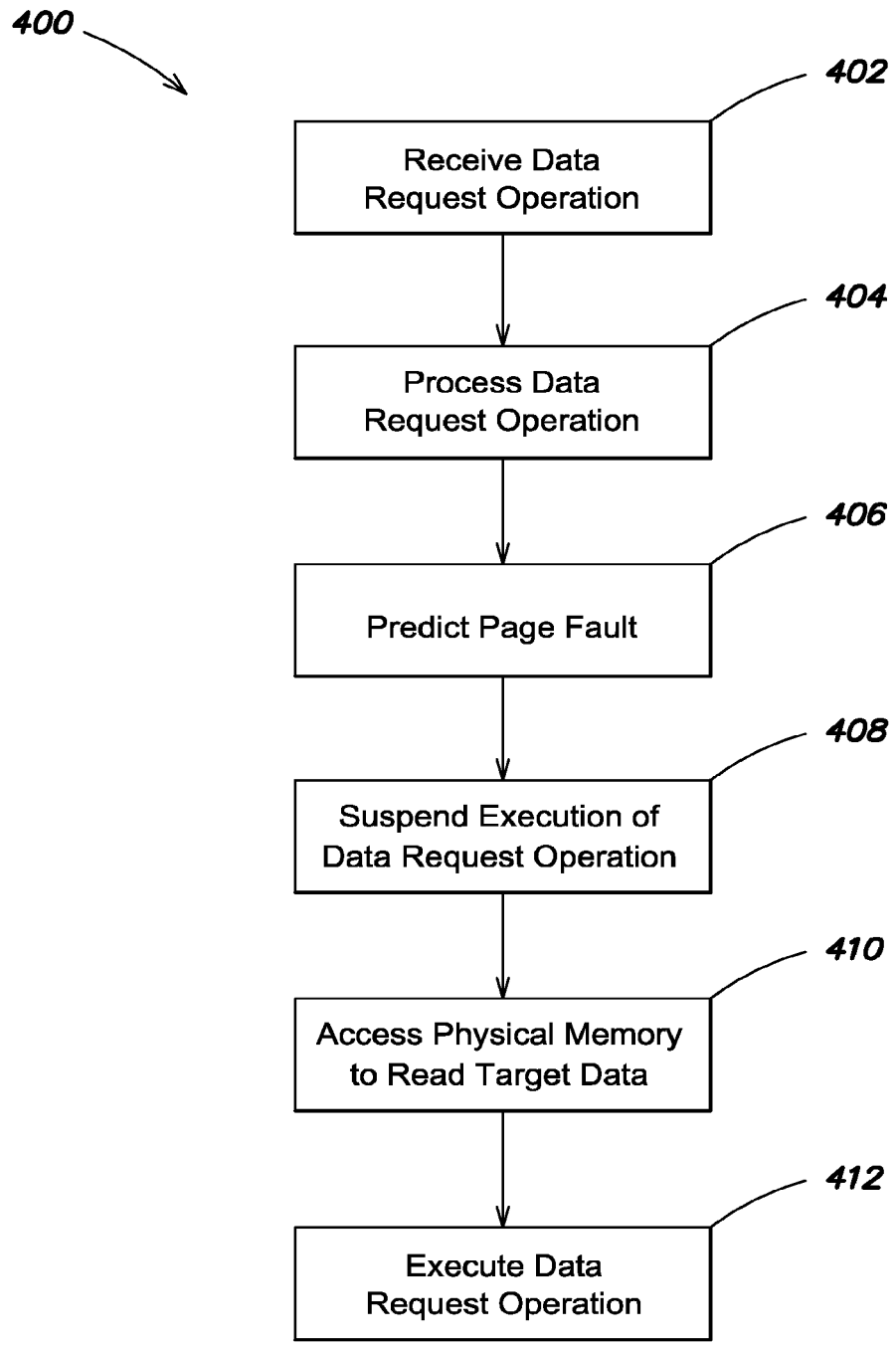
FIG. 4 is an example process flow for minimizing lock contention.

For example, the client 330 can request a write operation from the database system. The write operation can involve data found on record 320, and thus not in the active memory (e.g., on the memory device 306). FIG. 4 shows an example process 400 for minimizing lock contention according to one embodiment. The process 400 begins at 402 with receiving a data request operation. For example, the write operation request from the client 330 can be received by the database system. The database system processes the data request operation at 404. For example, the shard 302 can be a primary node that processes write operations for the database instance hosted on shard 302. The data request operation can target data found on record 320, which can be stored on the data store 310 and not found on the memory device 306.

Based on a model 340 of the data contained in the memory device 306, the system can predict a page fault at 406. In response to the prediction of the page fault, the system can suspend execution of the data request operation at 408. According to one embodiment, the system then releases the locks held by the data request operation. For example, the system can suspend the writing or mutating of any target data of the data request operation to release any locks held on the database. The system can then trigger the page fault, such that the fault and subsequent transfer of the page from disk to memory happen outside the critical section. Thus, the transfer occurs during a time when system is not holding a write lock, allowing subsequent operations to be executed.

According to some embodiments, the system can access the physical storage without contention (e.g., the data store 310) to read the target data into active memory (e.g., the memory device 306) at 410. Once the target data has been read into active memory, the system can execute the data request operation 412. In one example, the execution of the data request operation includes a delay period that can be tailored according to a time to retrieve data from physical storage In some embodiments, the data request operation can include a series of operations. For example, the data request operation can include a series of read operations followed by a write operation. In other examples, multiple clients can submit multiple data requests that are routed to a shard system. For a write request, access to the data store/long term memory may be required. In order to process a write, the system normally enters a critical section, which includes taking a lock to prevent contention on the target data of the write operation. If the target data is not resident in active memory, the lock and subsequent fault results in wasted compute cycles while the page fault is resolved. As discussed, a contention framework can be implemented to predict blocking faults. Thus any page fault can be transformed from a blocking fault by releasing any associated locks. For example, operations that trigger page faults (e.g., generated as a result of a write operation or any other operation) can be suspended, their locks released, and then the page fault can be triggered.

Suspending execution of the data request operation can then further involve storing the series of operations in memory along with any state while the physical storage is accessed to read the target data into active memory. Then, when the data request operation is re-executed, the entire series of operations can be executed according to the current state. For example, the series of operations can be to read A, read B, and write C, where A, B, and C are target data. A and B can be found in the active memory, while C is in the physical storage. In some conventional systems, a write to C would require a lock, and once the lock is acquired, the attempt to write to C would result in a page fault (e.g., managed by the operating system). Rather than permitting such a blocking fault, the system would determine that C is not resident in active memory based on analysis of a memory model of the active memory. The system is configured to suspend the execution once the request for C is made and the page miss is predicted. The system is configured to release any locks and/or prevent the locks from being taken and trigger the fault (e.g., by a read request) causing the transfer of C into the active memory. According to one embodiment, re-execution of the series of operations can be rolled back to the beginning, reading A, reading B, and then writing C (now resident in active memory), and thus executing the data request operation in active memory In some embodiments, the system can read A, read B, and upon suspending execution of C, write a state to memory, storing the state of variables and other information such that C can be executed upon reading the requested data into active memory.

In some embodiments, suspending execution of the data request operation allows other operations that are unrelated to the page fault to be executed concurrently while the target data is being read from physical storage. As the data request operation is suspended, a write lock that may be applied during execution of the data request operation would also be suspended or prevented from being applied, allowing the database to execute the other operations unrelated to the page fault. Further, as the entire series of operations that make up the data request operation is suspended and re-executed, potential data integrity issues for the data request operation are reduced.

In some embodiments, the system generates a model of the virtual memory 340. The system is configured to use the model of the virtual memory to identify data requests targeting information not in active memory. In one embodiment, the model of the virtual memory can be generated and maintained using a least recently used (LRU) algorithm and/or heuristics to define what pages are resident in the active memory and what pages are expected to require access to physical storage. The shard 302 can keep track of the pages of memory being swapped into and out of the active memory to maintain the model. The shard 302 can also receive information regarding data being read or written to, for example, from the operating system. The capacity of the active memory implemented on the shard can be stored as a configuration setting or data, and the shard can access configuration settings to determine what pages are expected to be within active memory. For example, the shard 302 can determine that the least recently used data will be replaced when new data is being written into the active memory responsive to the configuration setting or data defining the capacity of active memory. When the active memory is at capacity and new data is read in from physical storage, the system can identify the pages ejected from active memory based on LRU tracking. The shard 302 can also use heuristics, such as estimating an amount of time that target data remains in active memory depending on, for example, the amount/volume of pages being swapped, the amount/volume of data requests being executed, and/or other parameters indicative of a speed, volume, and/or amount of data being accessed. According to one embodiment, the virtual memory model can include a fully associative cache for tracking pages of memory and/or count pages of memory organizing data records.

According to one embodiment, the model of the virtual memory is implemented in user mode so the model is accessible by all user requested processes and is configured to track data accesses of all operations.

According to one embodiment, the shard 302 can run multiple threads. Each thread can allow operations to run on the database concurrently. The operation requests can be received from one or more clients. The shard 302 can generate the model of the virtual memory that enables the system to determine if the data that is being requested is stored in active memory or if the data being requested is stored in the physical storage. Threads running on the database can then determine which operations will generate a page fault, using the virtual memory model. In response to the system determining that target data is being stored in physical storage, the thread can touch the targeted data to read the target data into active memory from physical storage (e.g., the thread can execute a read request on the data). In some embodiments, the target data can be read into active memory, without using a write lock that blocks other threads from executing operations.

Example Computer Implementations

Processes described above are merely illustrative embodiments of systems that may generate and handle page faults in a database. Such illustrative embodiments are not intended to limit the scope of the present invention. None of the claims set forth below are intended to be limited to any particular implementation, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor.

Further, the system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS X Snow Leopard, MAC OS X Lion operating systems available from Apple Computer, the Solaris Operating System available from Sun Microsystems, iOS Blackberry OS, Windows 7 Mobile or Android OS operating system or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of the database system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 5:
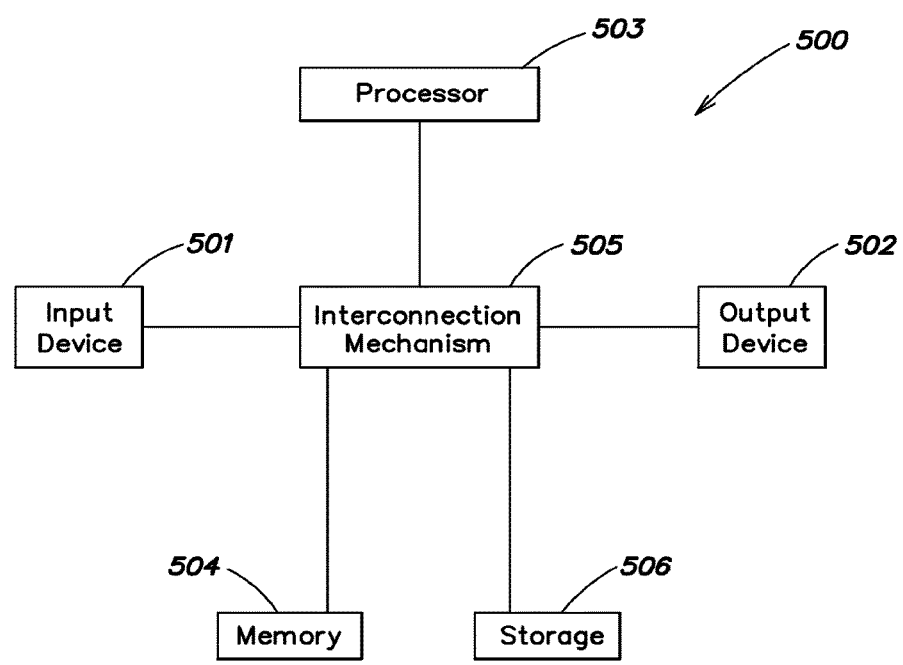
FIG. 5 is a block diagram of an example computer architecture on which aspects of the invention can be practiced.
Figure 6:
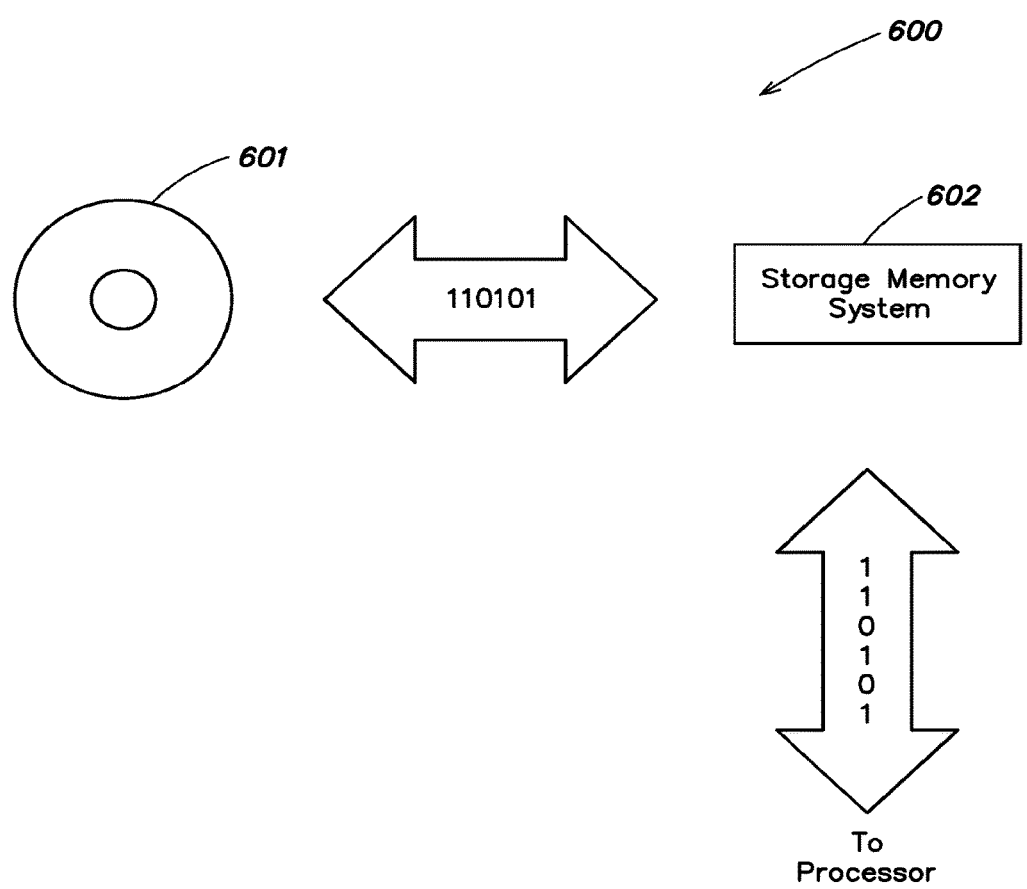
FIG. 6 is a block diagram of an example computer architecture on which aspects of the invention can be practiced.

Any number of systems of the database system 100 may be implemented on a computer system described below in relation to FIGS. 5 and 6. In particular, FIG. 5 shows an example computer system 500 used to implement various aspects. FIG. 6 shows an example storage system that may be used.

System 500 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate integration of the page fault handling system with the other systems and services according to various embodiments of the invention. System 500 can be configured to generate and handle page faults, and perform other functions such as receive and execute database operations, to provide some examples. Further, the system may be located on a single computer or may be distributed among a plurality of computers attached by a communications network.

For example, various aspects of the invention may be implemented as specialized software executing in a general-purpose computer system 500 such as that shown in FIG. 5. The computer system 500 may include a processor 503 connected to one or more memory devices 504, such as a disk drive, memory, or other device for storing data. Memory 504 is typically used for storing programs and data during operation of the computer system 500. Components of computer system 500 may be coupled by an interconnection mechanism 505, which may include one or more busses (e.g., between components that are integrated within a same machine) and/or a network (e.g., between components that reside on separate discrete machines). The interconnection mechanism 505 enables communications (e.g., data, instructions) to be exchanged between system components of system 500. Computer system 500 also includes one or more input/output devices 501-502, for example, a keyboard, mouse, trackball, microphone, touch screen, and one or more output devices 502, for example, a printing device, display screen, and/or speaker. In addition, computer system 500 may contain one or more interfaces (not shown) that connect computer system 500 to a communication network (in addition or as an alternative to the interconnection mechanism 505.

The storage system 506, shown in greater detail in FIG. 6, typically includes a computer readable and writeable non-volatile recording medium 601 in which signals are stored that define a program to be executed by the processor or information stored on or in the medium 601 to be processed by the program. The medium may, for example, be a disk or flash memory. Typically, in operation, the processor causes data to be read from the nonvolatile recording medium 601 into another memory 602 that allows for faster access to the information by the processor than does the medium 601. This memory 602 is typically a volatile, random access memory such as a dynamic random access memory (DRAM) or static memory (SRAM). It may be located in storage system 506, as shown, or in memory system 504, not shown. The processor 503 generally manipulates the data within the integrated circuit memory 504, 502 and then copies the data to the medium 601 after processing is completed. A variety of mechanisms are known for managing data movement between the medium 601 and the integrated circuit memory element 504, 602, and the invention is not limited thereto. The invention is not limited to a particular memory system 504 or storage system 506.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 500 is shown by way of example as one type of computer system upon which various aspects of the invention may be practiced, it should be appreciated that aspects of the invention are not limited to being implemented on the computer system as shown in FIG. 5. Various aspects of the invention may be practiced on one or more computers having a different architecture or components that that shown in FIG. 5.

Computer system 500 may be a general-purpose computer system that is programmable using a high-level computer programming language. Computer system 500 may be also implemented using specially programmed, special purpose hardware. In computer system 500, processor 503 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS Snow Leopard, MAC OS Snow Lion operating systems available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer-implemented method for minimizing lock contention in a distributed database, the method comprising:
   receiving a first data request operation on the distributed database, wherein the first data request operation includes at least one write request having target data;
   processing the first data request operation on at least one database instance of the distributed database;
   detecting, by a computer system, a potential page fault responsive to analyzing the target data of the at least one write request against a model of an active memory of the ate least one database instance;
   suspending execution of the first data request operation in response to determining that the target data is not present in the active memory, prior to triggering a page fault corresponding to the detected potential page fault;
   requesting access to a physical storage of the distributed database to read the target data into the active memory, during a time period for the suspending execution of the first data request operation; and
   re-executing the first data request operation upon expiration of the time period for the suspending execution of the first data request operation.

2. The method of claim 1, further comprising an act of executing any subsequent data request operations on the distributed database responsive to the suspending execution of the first data request operation.

3. The method of claim 1, further comprising generating the model of the active memory.

4. The method of claim 3, wherein the determining that the target data associated with the at least one write request will result in the page fault includes approximating data stored in the active memory based on the model.

5. The method of claim 1, wherein the suspending execution of the first data request operation includes relinquishing, by the computer system, any locks associated with the first data request operation.

6. The method of claim 5, wherein the suspending execution of the first data request operation includes storing the first data request operation for subsequent execution.

7. The method of claim 6, wherein the distributed database includes database instances including collections of data, and wherein at least a portion of the distributed database includes a collection.

8. The method of claim 7, wherein the at least the portion of the distributed database comprises the at least one database instance.

9. The method of claim 1, further comprising determining, by the computer system, that the first data request operation can be executed after yielding processing to subsequent operations.

10. The method of claim 9, wherein the determining that the first data request operation can be executed after yielding processing to the subsequent operations comprises determining that a data mutation has not occurred.

11. The method of claim 1, further comprising executing a second data request operation unrelated to the page fault while the first data request operation is suspended.

12. The method of claim 1, further comprising suspending execution of a second data request operation that generates an indication of another potential page fault.

13. The method of claim 12, further comprising queuing execution of the first and second data request operations.

14. The method of claim 13, further comprising optimizing the queuing by arranging an order of the first and second data request operations based on physical locations of data requested by each operation.

15. A system for minimizing lock contention in a distributed database environment, the system comprising:
- at least one processor, implemented at least partially by hardware, operatively connected to a memory, the at least one processor when executing is configured to execute a plurality of system components, wherein the system components comprise:
  - a database management component configured to manage database instances, the database management component also configured to receive a first data request operation on the distributed database;
  - an execution component configured to process the first data request operation including at least one write request, having target data, on at least one database instance managed by the database management component;
  - a fault prediction component configured to detect a potential page fault responsive to analyzing target data of the at least one write request against a model of an active memory of the at least one database instance; and
- wherein the execution component is further configured to:
  - suspend execution of the first data request operation in response to determining that the target data is not present in the active memory, prior to triggering a page fault corresponding to the detected potential page fault;
  - request access a physical storage to read the target data into the active memory; and
  - re-execute the first data request operation after a period of time for the suspending execution of the first data request operation.

16. The system of claim 15, further comprising a model component configured to generate the model of the active memory.

17. The system of claim 16, wherein the determining that the target data associated with the at least one write request will result in the page fault includes approximating the data stored in the active memory based on the model.

18. The system of claim 17, wherein the at least one processor is configured to determine that the first data request operation can be executed after yielding processing to subsequent operations.

19. The system of claim 18, wherein the at least one processor is configured to determine that data mutations have not occurred responsive to the first data request operation.

20. The system of claim 15, wherein the suspending execution of the first data request operation includes relinquishing any locks associated with the first data request operation.

21. The system of claim 15, wherein the requesting access to the physical storage to read the target data into the active memory, is executed during the period of time period for suspending execution of the first data request operation.

22. The system of claim 15, wherein the execution component is configured to execute a second data request operation unrelated to the first data request operation while the first data request operation is suspended.

* * * * *